United States Patent Office 3,540,308
Patented Nov. 17, 1970

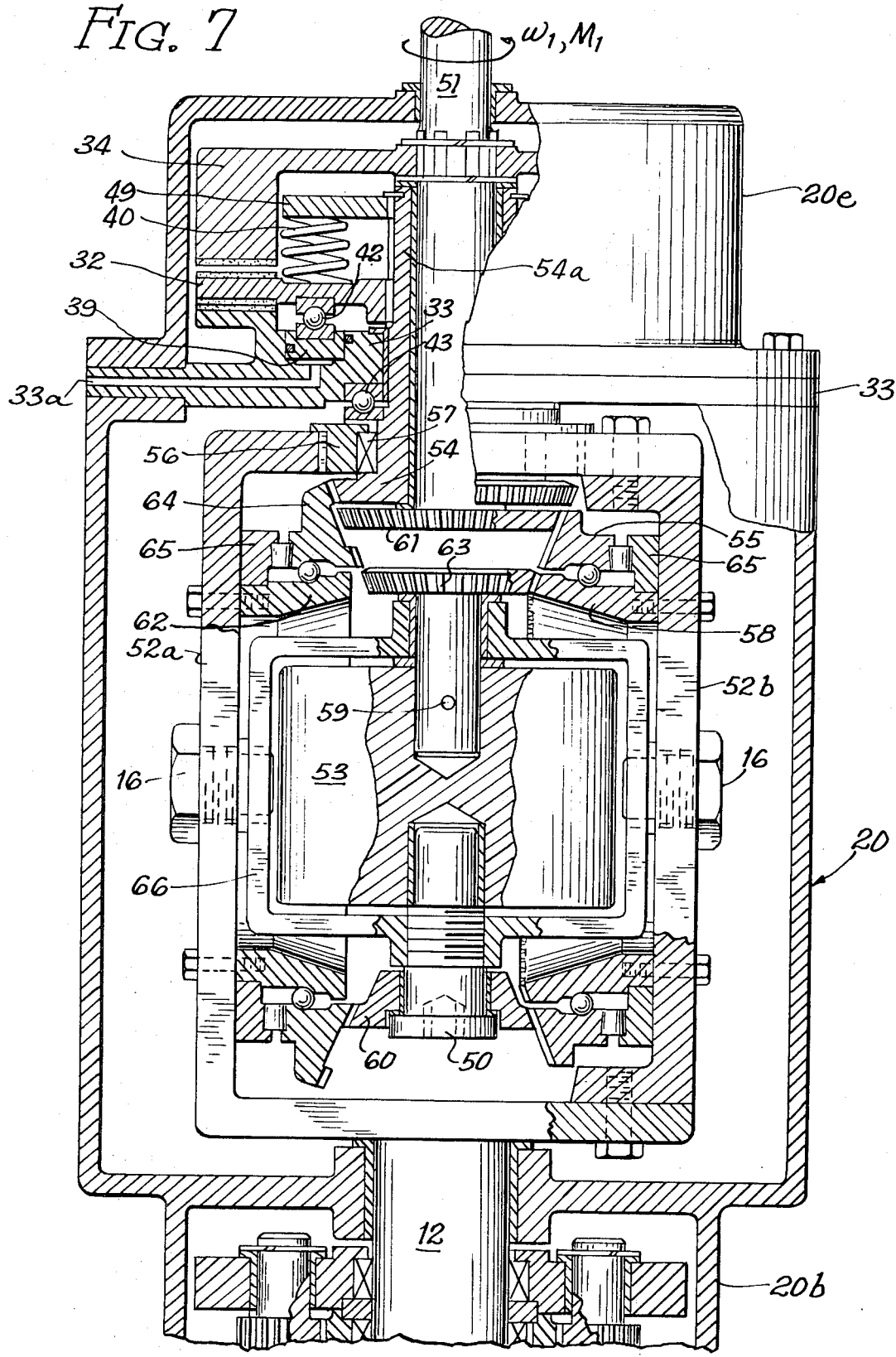

3,540,308
MECHANICAL TORQUE CONVERTER
Martin Preston, 300 N. State St., Apt. 5701,
Chicago, Ill. 60610
Filed Apr. 21, 1969, Ser. No. 817,918
Int. Cl. F16h 3/74
U.S. Cl. 74—751                                    3 Claims

ABSTRACT OF THE DISCLOSURE

A stepless, variable-speed power transmitting device in which the ratio of the input shaft speed to that of the output shaft depends (a) on the external torque load applied to the output shaft and (b) on the speed of the power driven input shaft. Power is transmitted from the input to the ouput shaft through a spinning rotor, the axis of which is forced to undergo a cyclic precessional motion. During subsequent alternate phases of this cyclic motion power is transmitted from the input shaft to the rotor and then from the rotor to the output shaft.

PRIOR ART RELATED TO THIS INVENTION

The device disclosed in his application like the one described in my U.S. Pats. 3,439,561, filed Apr. 12, 1968 and 3,394,619, filed May 19, 1967 represents a mechanical torque converter which transmits mechanical power by the application of gyroscopic (inertia) forces. The mechanisms described in each of these disclosures comprise a spinning rotor on which a precessional motion is imposed giving rise to a gyroscopic moment. While in the former disclosures the precessional motion of the spinning rotor was accompanied by a cyclic variation of the rotor inertia, in the device covered by the present application the rotor inertia is constant. Consequently, the mechanical parts required for producing a change of the rotor inertia which were incorporated in the previously disclosed devices do not appear in the mechanism covered by the present application. Hence, the device disclosed by the present application represents a simplification and, therefore, an improvement over that disclosed in my prior patents.

The above mentioned simplification of the design was made possible by a modification of the operating principle underlying the operation of the devices of my aforementioned patents.

In the earlier concepts of the torque converter power was transmitted intermittently from the input shaft to the rotor and vice versa through one-way clutches by one or the other of the two gear trains interposed between the input shaft and the rotor. Thus, the gear arrangement constituted a bifurcated power path, one branch of which supplied energy to the rotor while the other returned part of this energy to the input shaft (or the whole of it when the output shaft was stalled). The balance of these two alternate flows of energy was passed on to the output shaft (when the output shaft performed work).

Contrastingly, in the present invention it is the output shaft and the rotor between which the aforementioned one-way clutches and gearing are interposed and it is the input shaft that supplies the balance of the alternating flow of energy between rotor and output shaft. This arrangement obviates the need for the variation of the rotor inertia for the proper functioning of the device and also results in performance improvements which will become apparent from the detailed description that follows.

IDENTIFICATION OF DIAGRAMS

The invention is more fully described in the accompanying drawings, of which:

FIG. 7 is a partial elevational sectional view of another modification of the simple embodiment shown in FIG. 1; the lower partly omitted portion of FIG. 7 being identical with the lower portion of FIG. 1.

DESCRIPTION OF DIAGRAMS

Figure 1:
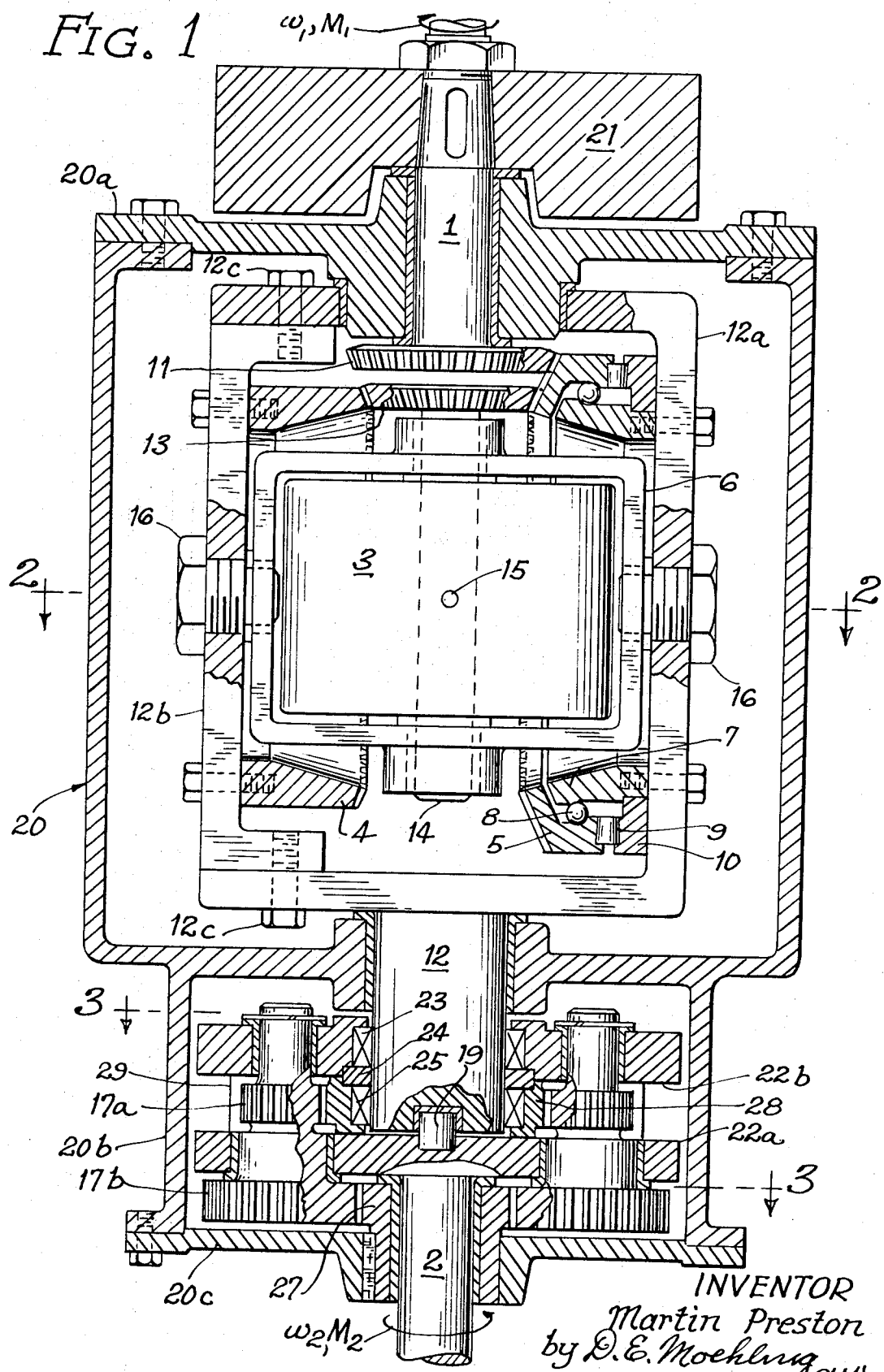
FIG. 1, is an elevational sectional view of a simple embodiment of the device.
Figure 2:
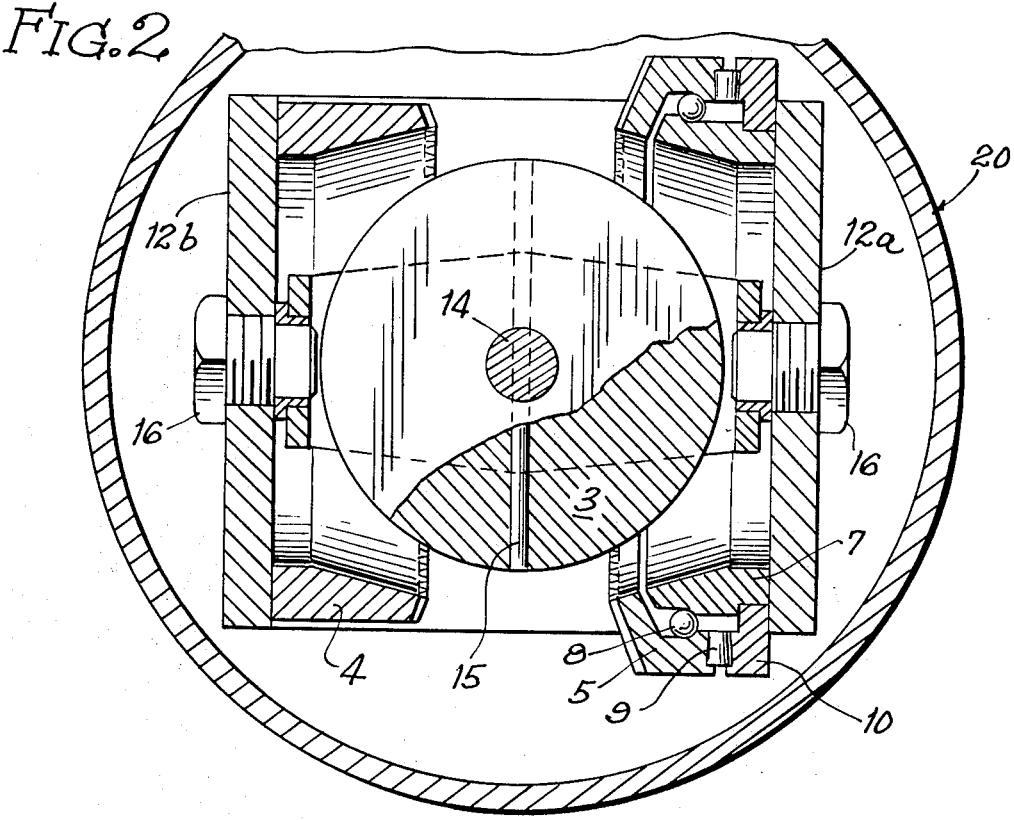
FIG. 2, is a plan sectional view taken on line 2—2 on FIG. 1.
Figure 3:
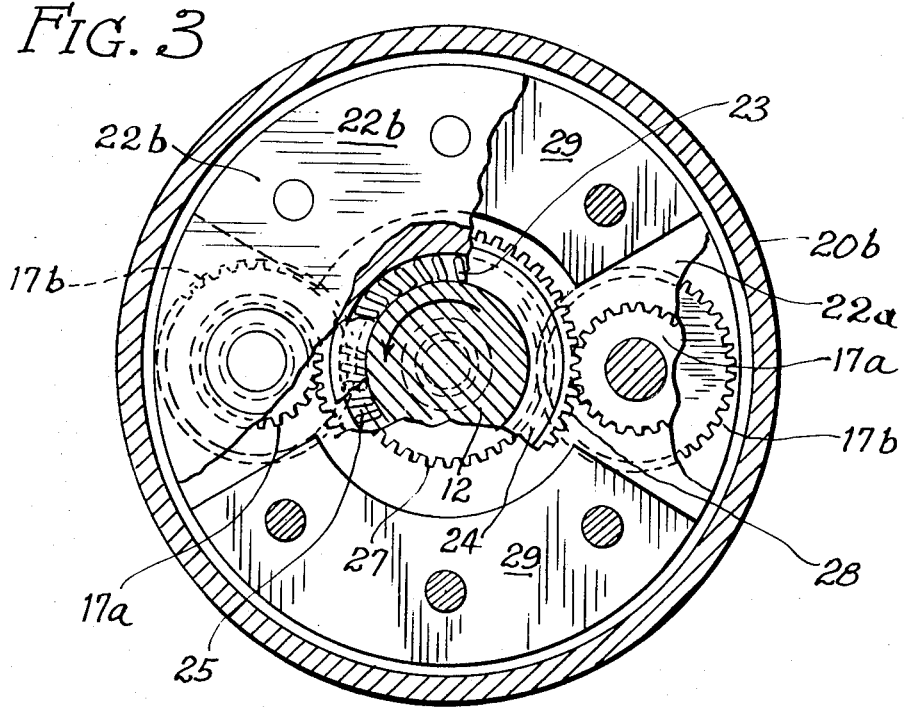
FIG. 3, is a plan sectional view taken on line 3—3 on FIG. 1.

The embodiment of the device shown in FIGS. 1–3 comprises input shaft 1 driven by an external source of power and a coaxial output shaft 2 delivering power to the outside, both shafts being journalled in stationary housing 20 that comprises top cover 20a in which the input shaft is bushed, gear case 20b which houses a planetary gear set and gear case cover 20c in which the output shaft is bushed. Inside of said stationary housing input shaft 1 carries on its lower end bevel gear 11 which is integral therewith and outside of the housing it mounts flywheel 21 which is keyed thereto.

The planetary gear set mounted in the aforementioned gear case 20b serves to transmit power from stub shaft 12 to output shaft 2. Stub shaft 12 is integral with rectangular torque frame 12a, the latter having a removable side 12b which is held in place by bolts 12c. Torque frame 12a carries on pivots 16 gimbal frame 6 which in turn mounts rotor 3 which is journalled by shaft 14 in said gimbal frame. The rotor is secured by pin 15 to shaft 14, integral with bevel gear 13.

Ring gear 5 rotates freely on radial bearing 8 and thrust bearing 9, the stationary races of which are attached to the inner surface of torque frame 12a. Said ring gear 5 meshes simultaneously with aforementioned bevel gears 11 and 13. The stationary race 10 of thrust bearing 9 is clamped against the torque frame by stationary race 7 of radial bearing 8, race 7 being firmly bolted to the torque frame. Said bevel gear 13 is also in mesh with fixed ring gear 4 which is bolted to the removable side 12b of the torque frame.

It will be seen from the foregoing that if input shaft 1 is steadily rotated while stub shaft 12 of the torque frame is being held stationary, rotor 3 will rotate about its own axis and at the same time the rotor axis together with gimbal frame 6 will be progressively tilted about pivots 16. The spinning of the rotor combined with the continued tilting motion of its axis (the latter constituting what was previously described as the precessional motion of the rotor) will give rise to a fluctuating gyroscopic torque acting on the torque frame. Thus, a sinusoidal torque will be applied to stub shaft 12 and this torque will reverse its direction at every half precessional revolution of the rotor axis, that is, at every half revolution of gimbal frame 6 about its pivots 16.

To convert this torque into a unidirectional one, or using an electrical analogy, to "rectify" it, a planetary gear set incorporating two one-way clutches is interposed between stub shaft 12 and output shaft 2. This gear set consists of planet carrier 22a, which is a circular disk integral with output shaft 2 and to which a second circular disk 22b is bolted with arcuate spacers 29 interposed between the disks (FIGS. 1 and 3). The substantial mass of this assembly provides the output shaft with a flywheel effect, which, together with the aforementioned flywheel 21 of the input shaft, tends to smoothen out the dynamic effect of the intermittent passage of power from one shaft to the other.

Composite planet pinions 17a and 17b journalled in said planet carrier mesh with sun gear 28 and with fixed sun gear 27, respectively, the latter being keyed to stationary gear case cover 20c. Stub shaft 12 is mechanically linked with the planet carrier by one-way clutch 23 in such a manner that the former will drive the latter in the indicated counterclockwise direction (FIG. 3), but the latter can overrun the former in the counterclockwise direction. A second, opposite hand, one-way clutch 25, interposed between stub shaft 12 and sun gear 28 permits the former to overrun the latter in the indicated direction but not vice versa. As shown in FIG. 1 spacer ring 24 serves to keep one-way clutches 23 and 25 in proper axial alignment and pilot bearing 19 keeps stub shaft 12 in proper alignment with output shaft 2. It can be deduced from the respective sizes of planet pinions 17a and 17b that if output shaft 2 is rotated in the indicated direction, sun gear 28 will rotate in the same direction but at a lower speed. Designating the ratio of the speed of the sun gear to that of the output shaft by the letter $\gamma$ which has a value of less than 1, it can be concluded that a unit torque applied to sun gear 28 by stub shaft 12 in the clockwise direction will produce a clockwise torque of magnitude $\gamma$ on the output shaft. Contrariwise a counterclockwise unit torque applied to the stub shaft will act directly through one-way clutch 23 on the planet carrier and will result in a counterclockwise unit torque acting on the output shaft. It can be deduced from the foregoing that if the precessing rotor applies a sinusoidal torque of unit amplitude through the torque frame to the stub shaft, the stationary output shaft will be subjected to a variable turning moment whose mean value is $$\frac{1-\gamma}{\pi}$$

frictional losses being neglected.

From the elementary theory of the gyroscope it can be deduced that the amplitude of the torque imposed on the stub shaft is:

$$I_3\omega_1^2 \frac{\tan \beta}{4}$$

in which $\omega_1$ is the speed of the input shaft, $I_3$ is the axial moment of inertia of the rotor and $\beta$ is one half of the common central angle of bevel gears 11 and 13. It follows from this that the mean torque acting on the stalled output shaft (i.e. the stall torque) will be:

$$M_2 = I_3\omega_1^2 \frac{1-\gamma}{4\pi} \tan \beta$$

At the same time the torque applied to the input shaft ($M_1$) will be zero, disregarding friction.

Figure 5:
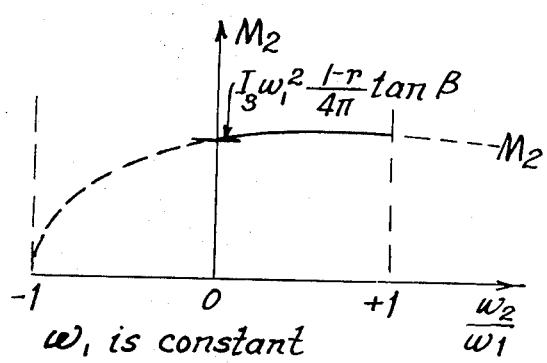
FIG. 5, is a graph showing the performance characteristics of the device illustrated in FIGS. 1–3.

In the foregoing the particular operating condition was considered under which the output shaft was stalled by an external resistance that exceeded the output torque $M_2$ which was shown to be proportional to the square of the input speed $\omega_1$. Under these conditions if the input speed is raised or, alternatively, the external resistance is lowered sufficiently so that $M_2$ exceeds the external resistance, then the output shaft will begin to rotate at speed $\omega_2$ in the direction indicated in FIG. 1. The relationship between output speed and output torque depends on several built-in parameters of the device, one of which is the previously defined gear ratio $\gamma$ and the others involve the moments of inertia of the torque frame, of the ring gears and of the rotor taken about their respective axes of rotation. FIG. 5 shows the relationship between output torque $M_2$ and the dimensionless speed ratio $\omega_1/\omega_2$ for a particular set of values of the aforementioned built-in parameters and under the assumption of constant input shaft speed.

The right hand branch of the output torque curve drawn in solid line shows that if the input shaft is driven at constant speed in the indicated clockwise direction (viewed from above), the output torque will remain virtually unchanged for any output speed (in the counterclockwise direction). It can be shown also that the only limitations on the output speed are the permissible stresses in the rotating components subjected to dynamic forces. Contrariwise, the left hand branch of the output torque curve drawn in broken line indicates that the output torque drops rapidly to zero if the input shaft is driven in the counterclockwise direction. The reason for this lopsidedness of the torque curve lies in the fact that the larger the sum of the speeds of the input and output shafts, the larger will be both the spin velocity of the rotor and the precessional velocity of the rotor axis. The right hand side of the torque curve applies to the situation in which the input shaft speed is positive, that is, it is oriented in the direction shown in FIG. 1. If the direction of rotation of the input shaft is reversed, that is, if its speed becomes negative, while the output shaft speed (its direction of rotation being irreversible) remains positive, the sum of the input and output shaft speeds will rapidly diminish as the gap between the speeds of the two shafts narrows and ultimately the rotor velocities (both spin and precessional) will vanish. This will be easily seen if we assume that input shaft 1, output shaft 2 and the therewith associated planet carrier, as well as stub shaft 12, torque frame 12a, and 12b, all rotate in the same counterclockwise direction as indicated for stub shaft 12 in FIG. 3. Under these conditions both the spin and the precessional velocities of rotor 3, as well as the gyroscopic couples resulting from these velocities and acting on said torque frame will vanish and the output torque will be zero. This condition is indicated by the left hand branch of the torque curve.

This left hand branch of the torque curve is similar to to the torque curve of the conventional hydrodynamic torque converter in which the output torque also vanishes when the output speed approaches the input speed. For this reason it is only the right hand branch of the torque curve (which is characterized by a virtually constant output torque) that sharply distinguishes the performance of the present embodiment from that of the conventional hydrodynamic device. This is why the direction of rotation of the input shaft is shown as being opposite to that of the output shaft.

Figure 4:
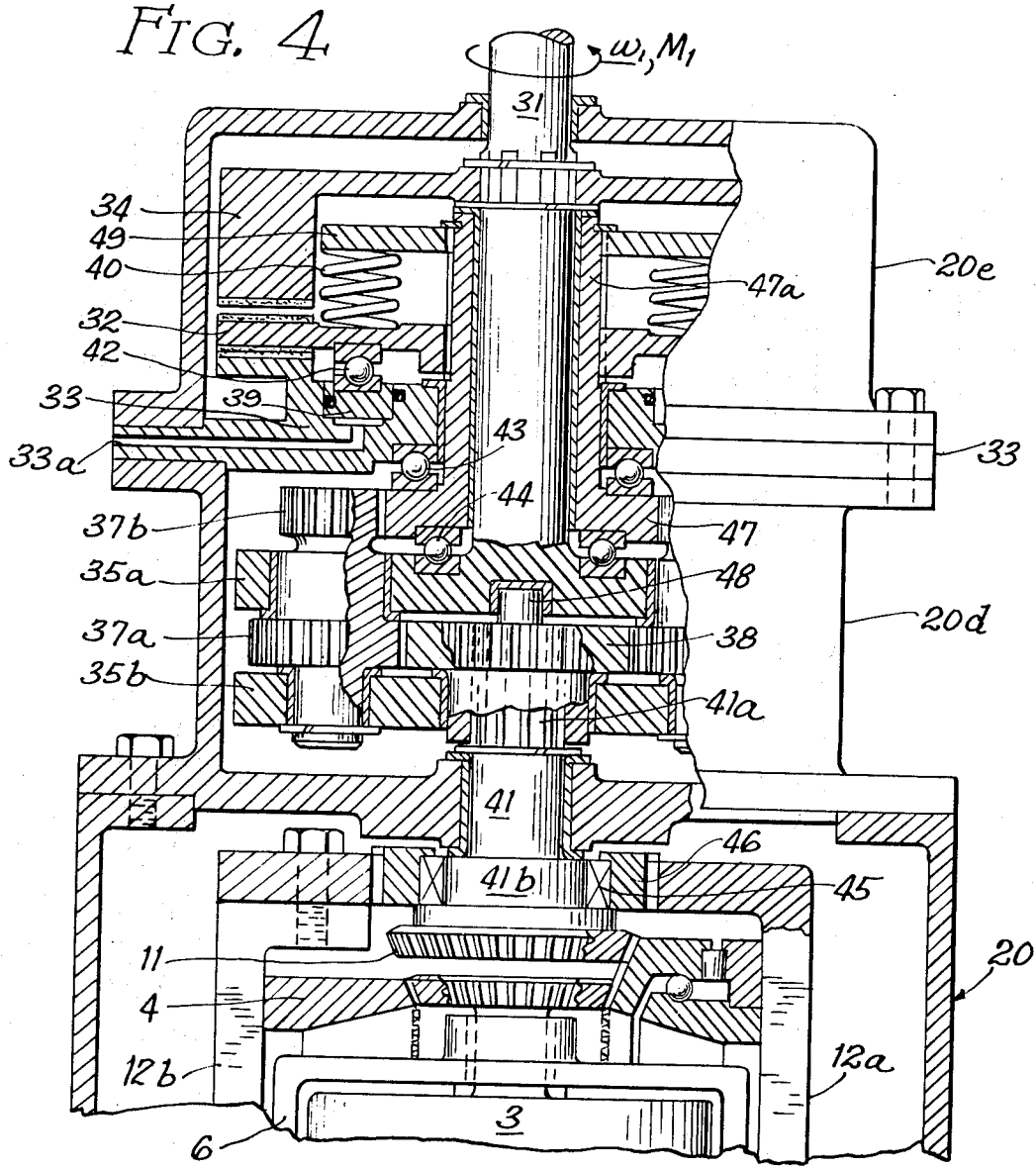
FIG. 4, is a partial elevational sectional view of a modified embodiment of the device, the lower partly omitted portion of which is identical with the lower portion of FIG. 1.

The commonly adopted practice of providing means for interlocking the input and output shafts of the conventional hydrodynamic torque converters when the shaft speeds become equal, so as to obtain "direct drive," can be adapted to the present device, too, and FIG. 4 shows an example of such an arrangement. The only partly shown lower portion of this embodiment is identical with that shown in FIG. 1.

As shown in FIG. 4, input shaft 31 is driven (when viewed from above) in the same counterclockwise direction as output shaft 2. This involves the interposition of a selectively activated reversing gear between input shaft 31 and bevel gear 11 which is housed in both the upper and lower gear cases 20e and 20d, respectively. The flywheel of the original embodiment takes the form in the present modified version of flanged disk 34 which is rigidly connected by splines and snap rings to input shaft 31. The lower end of said input shaft is integral with the upper circular disk 35a of a planet carrier which also comprises the lower circular disk 35b and arcuate spacers sandwiched between the two disks, much like in the planet carrier associated with output shaft 2 and shown in FIG. 1.

Composite pinions 37a and 37b are journalled in said planet carrier 35a, the former meshing with sun gear 38 and the latter with sun gear 47. Shaft 41 is splined to sun gear 38 by splines 41a and carries integral bevel gear 11 on its lower end. Shaft 41 is coaxial with input shaft 31 with which it is aligned by pilot bearing 47. Aforementioned sun gear 47 is integral with externally splined sleeve 47a, the splines of which engage spring retainer 49 and brake disk 32. Normally, compression springs 40, interposed between said spring retainer 49 and brake disk 32, force the underside of the brake disk against the top surface of stationary base plate 33. Since the contact surfaces are covered with brake lining, the friction between these surfaces will hold sleeve 47a and the therewith integral sun gear 47 stationary unless annular piston 39 actuated by fluid entering through opening 33a lifts brake disk 32 (by thrust bearing 42) from its seat against the force of springs 40. The piston then presses the top surface of brake disk 32 against the underside of aforementioned flanged disk 34. Since these mating surfaces are also covered with friction lining, the action of the piston will lock sun gear 47 to the planet carrier so that the whole gear assembly will rotate together with the input shaft and with bevel gear 11 as a single solid body. The axial thrust of the piston is then taken up by thrust bearings 44 and 43. Under these conditions one-way clutch 45 interposed between the stepped up portion 41b of shaft 41 and drive ring 46, which is splined to torque frame 12a, will cause the torque frame to rotate together with bevel gear 11 and with input shaft 31 and so direct drive will be established between input shaft 31 and output shaft 2 with all components rotating together as a solid body in the counterclockwise direction.

On the other hand, if no fluid pressure is applied to the piston and sun gear 47 is held stationary by brake disk 32, then because of the fact that planet pinion 37a is larger than planet pinion 37b, sun gear 38 and the therewith splined shaft 41, carrying bevel gear 11 at its lower end will be forced to rotate in clockwise direction while output shaft 2, as in the original embodiment, will tend to rotate in the counterclockwise direction, same as input shaft 31. Under these conditions, if and when the output shaft speed approaches that of the input shaft, fluid pressure applied to the piston will produce a direct drive. The application of fluid pressure to the piston can be triggered automatically. For instance two identical fixed displacement fluid pumps may be driven individually from the input and output shafts of the device. Putting their hydraulic circuits in series and tapping this circuit for the control of a pilot-operated valve that admits fluid under pressure to the base plate 33 of the device, the admission of fluid is thereby made conditional on identical deliveries of the two pumps, which will occur only if their speeds are the same.

In the earlier discussion of the torque-speed relationship of the original embodiment, which relationship is defined by the graph of FIG. 5, it was pointed out that if the input and output shafts rotate in opposite direction, an increase in the speed of either shaft will cause an increase both in the spin velocity of the rotor (in reference to the gimbal frame in which it is journalled) and in the precessional velocity of the rotor axis (in reference to the torque frame). It was also pointed out that, conversely, if both input and output shafts run in the same direction, then both the spin and precessional velocity of the rotor will decrease if the speed difference of the two shafts diminishes. This relationship can be concisely given by the equation $$\omega_3 \text{ maximum} = \frac{\omega_1 + \omega_2}{2}$$

and $$\omega_6 \text{ maximum} = \frac{\omega_1 + \omega_2}{2} \tan \beta$$

in which $\omega_3$ is the spin velocity of the rotor which varies cyclically and $\omega_6$ is the precessional velocity of the rotor axis which also varies cyclically. The input shaft speed $\omega_1$ is positive in the direction of rotation indicated in FIG. 1 and negative in the opposite direction. The output shaft speed is irreversibly oriented in the positive direction shown in FIG. 1. (This direction could be reversed only by the interchange of one-way clutches 23 and 25.) The angle $\beta$ denotes one half of the common central angle of bevel gears 11 and 13.

It can be shown that in order to obtain linear performance characteristics, that is, to straighten out the torque curve in the $M_2$ versus $\omega_2/\omega_1$ plot shown in FIG. 5, a necessary (but not sufficient) condition is that the spin and precessional velocities of the rotor be made independent from the output shaft speed. This requirement can be satisfied by another modification of the original embodiment of FIG. 1 at the cost of a somewhat more complicated gearing arrangement, shown in FIG. 7. For this modified embodiment the spin and precessional velocities are defined as follows:

$$\omega_3 = \frac{\omega_1}{2}$$

and $$\omega_6 = \frac{\omega_1}{2} \tan \beta$$

In the modified embodiment shown in FIG. 7 (the partly shown lower portion of which is identical with that of FIG. 1) ring gear 64 rotates freely on torque frame 52a which is integral, as before, with stub shaft 12. On the opposite side, ring gear 55 is rotatably mounted on the removable side 52b of said torque frame. Idler gear 60 is freely journalled on pin 50 which is affixed to gimbal frame 66 which is mounted on pivots 16 held by said torque frame. Stationary ring gear 58 is rigidly mounted on removable side 52b of the torque frame. It constitutes the inner bearing race of ring gear 55 and serves also as a clamp to attach thrust bearing race 65 to the torque frame. On the opposite side of the torque frame, inner race 62 serves as a clamp to affix thrust bearing race 65 to the torque frame. Bevel gear 63 meshes with ring gear 58 and is rigidly connected by pin 59 to rotor 53 which is journalled in gimbal frame 66 by aforementioned pin 50 and by the shank of bevel gear 63. Idler gear 60 meshes simultaneously with ring gears 55 and 64. Ring gear 55 is also in mesh with bevel gear 61 which is integral with input shaft 51. Ring gear 64 is also in mesh with (normally stationary) anchor pinion 54 which is integral with sleeve 54a in which said input shaft 51 is bushed.

Upper gear case 20e contains the hydraulically operated brake-clutch mechanism similar to that shown in FIG. 4 heretofore described. In the absence of fluid pressure the mechanism acts as a brake and locks anchor pinion 54 to stationary base plate 33. Under this condition it will be seen that the turning of stub shaft 12, while input shaft 51 is at rest, will keep gimbal frame 66 in a fixed position relative to the torque frame and will not cause any turning of the rotor in its journals.

Contrariwise, it will be seen that if stub shaft 12 is held fast while input shaft 51 is rotated, ring gear 55 will turn and cause precession of the rotor axis and also the turning of the rotor. It can be concluded from the foregoing that the spin and precessional velocities of the rotor will always be proportional to the input shaft speed, but independent of the output shaft speed.

Figure 6:
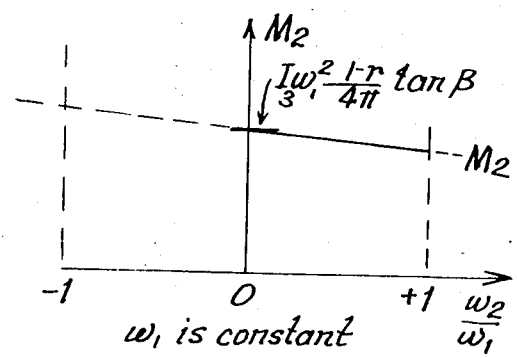
FIG. 6 is a graph showing the performance characteristics of the device illustrated in FIG. 7.

FIG. 6 shows (for a particular set of values of the various builtin parameters) the output torque $M_2$ versus the dimensionless speed ratio $\omega_2/\omega_1$. Only the right hand branch of the torque curve drawn in solid line has practical significance. It applies to positive values of $\omega_1$; that is, to a condition in which both input and output shafts rotate in the same counterclockwise direction. It can be concluded from the shape of the torque curve (a straight line) that the output torque is a linear function of the output speed.

When and if the output speed approaches the input speed, the application of fluid pressure to the annular piston 39 will lock the aforementioned anchor pinion to the input shaft. Then one-way clutch 57 mounted between sleeve 54a and the externally splined drive ring 56 will entrain said torque frame 52a and the entire mechanism will rotate like a solid body and thus direct drive will be established.

In all embodiments shown in FIGS. 1–7 it was the input shaft that received power from the outside and the output shaft that delivered power to the outside. The functioning of the component parts of the device will remain the same if the flow of power is reversed, that is, if the external source of power is applied to the output shaft and power is taken off from the input shaft. However, in this case the stall torque will be zero. Also, in all embodiments both the bevel and the spur gears are shown as being of the straight tooth type; however, the former may be replaced advantageously with spiral type and the latter with helical type gears. Furthermore, most of the bearings shown are of the sleeve type, some, however, may be advantageously replaced with antifriction bearings.

I claim as my invention:

1. A mechanical torque converter comprising a stationary housing in which a first shaft and a second shaft are journalled, the first shaft being driven by an external source of power and the second shaft delivering power to the outside; a first bevel gear operatively connected to said first shaft; a torque frame rotatably mounted in said stationary housing; a gimbal frame rotatably mounted on said torque frame, its axis of rotation being orthogonal to the axis of rotation of said torque frame; a rotor of substantial inertia journalled in said gimbal frame, the spin axis of which is orthogonal to the axis of rotation of said gimbal frame; a second bevel gear rigidly attached to said rotor; gear means interposed between said first bevel gear and said second bevel gear; gear means attached to said torque frame and in mesh with said second bevel gear, both said gear means causing the simultaneous rotation of said rotor about its spin axis and also about the axis of rotation of said gimbal frame when the first bevel gear is rotated; a first one-way clutch driven by said torque frame; drive means interposed between said first one-way clutch and said second shaft, intermittently delivering power to said second shaft; a second one-way clutch drivingly connected to said torque frame; drive means interposed between said second shaft and said second one-way clutch, intermittently delivering power from said second shaft.

2. The device of claim 1 further characterized in that said first bevel gear which is operatively connected to said first shaft, is being driven by said first shaft through a set of reversing gears in a direction opposite to that of said first shaft; means for selectively locking up said set of reversing gears whereby said first bevel gear is driven directly by said first shaft; a third one-way clutch interposed between the first bevel gear and the torque frame, the first shaft thereby driving the torque frame directly through the third one-way clutch when the set of reversing gears is locked up.

3. A mechanical torque converter comprising a stationary housing in which a first shaft and a second shaft are journalled, the first shaft being driven by an external source of power and the second shaft delivering power to the outside; a first bevel gear rigidly affixed to said first shaft; a torque frame rotatably mounted in said stationary housing; a gimbal frame rotatably mounted on said torque frame, its axis of rotation being orthogonal to the axis of rotation of said torque frame; a rotor of substantial inertia journalled in said gimbal frame, the spin axis of which is orthogonal to the axis of rotation of said gimbal frame; a second bevel gear rigidly attached to said rotor; an idler gear freely journalled on said gimbal frame; an anchor pinion coaxial with said first shaft and rotatably mounted in said stationary housing; gear means for drivingly connecting said idler gear with said first bevel gear; gear means for drivingly connecting said idler gear with said anchor pinion; brake means for selectively locking said anchor pinion to said stationary housing; clutch means for selectively locking said anchor pinion to said first shaft; a first one-way clutch driven by said torque frame; drive means interposed between said first one-way clutch and said second shaft, intermittently delivering power to said second shaft; a second one-way clutch drivingly connected to said torque frame; drive means interposed between said second shaft and said second one-way clutch, intermittently delivering power from said second shaft; a third one-way clutch interposed between said anchor pinion and said torque frame whereby the torque frame is driven directly by said first shaft when said anchor pinion is locked to said first shaft.

References Cited

UNITED STATES PATENTS

| 1,544,834 | 7/1925 | Gooder | 74—751 |
| 1,992,457 | 2/1935 | Anderson | 74—751 X |
| 2,052,507 | 8/1936 | Walton | 74—751 |
| 2,634,631 | 5/1953 | Taylor | 74—751 |

FOREIGN PATENTS

| 414,693 | 8/1934 | Great Britain. |
| 460,372 | 11/1950 | Italy. |

CARLTON R. CROYLE, Primary Examiner

T. C. PERRY, Assistant Examiner